US012564812B2

(12) United States Patent
Fang et al.

(10) Patent No.: US 12,564,812 B2
(45) Date of Patent: Mar. 3, 2026

(54) TWO-STAGE ELECTRODIALYSIS SYSTEM AND METHOD FOR RECOVERING WASTE $CO_2$-LEAN AMINE SOLVENT

(71) Applicant: Zhejiang University, Hangzhou City (CN)

(72) Inventors: Mengxiang Fang, Hangzhou City (CN); Yuwei Wang, Hangzhou City (CN); Zhixiang Xia, Hangzhou City (CN); Tao Wang, Hangzhou City (CN); Qinhui Wang, Hangzhou City (CN); Zhongyang Luo, Hangzhou City (CN)

(73) Assignee: Zhejiang University, Hangzhou City (CN)

( * ) Notice: Subject to any disclaimer, the term of this patent is extended or adjusted under 35 U.S.C. 154(b) by 903 days.

(21) Appl. No.: 17/848,863

(22) Filed: Jun. 24, 2022

(65) Prior Publication Data

US 2023/0182075 A1 Jun. 15, 2023

(30) Foreign Application Priority Data

Dec. 15, 2021 (CN) ......................... 202111533765.8

(51) Int. Cl.
*B01D 53/96* (2006.01)
*B01D 61/44* (2006.01)
*B01D 61/50* (2006.01)

(52) U.S. Cl.
CPC ......... *B01D 53/965* (2013.01); *B01D 61/445* (2013.01); *B01D 61/50* (2013.01);
(Continued)

(58) Field of Classification Search
CPC .... B01D 53/965; B01D 61/445; B01D 61/50; B01D 2252/204; B01D 2257/504;
(Continued)

(56) References Cited

U.S. PATENT DOCUMENTS 5,292,407 A * 3/1994 Roy ........................ B01D 61/44 205/431
5,622,681 A * 4/1997 Grierson .............. B01D 61/243 423/242.7

(Continued)

OTHER PUBLICATIONS

"Heat Stable Salts (HSS) Removal by Electrodialysis: Reclaiming of MEA Used in Post-Combustion CO2-Capture" by Bazhenov et al., Energy Procedia 63, pp. 6349-6356 (2014).*
"Removal of Heat Stable Salts (HSS) from Spent Alkanolamine Wastewater Using Electrodialysis" by Wang et al., J. Industrial & Eng. Chem. 57, pp. 356-362 (2018).*
"Two-Step Electrodialysis Treatment of Monoethanolamine to Remove Heat Stable Salts" by Grushevenko et al., Russian J. of Appl. Chem. 91(4), pp. 602-610 (2018); ISSN 1070-4272.*

*Primary Examiner* — Bryan D. Ripa
(74) *Attorney, Agent, or Firm* — Hoffmann & Baron, LLP

(57) ABSTRACT

A two-stage electrodialysis system and a method for recovering waste $CO_2$-lean amine solvent are provided. The system includes an amine solution pretreatment filtering system, a C-A homogeneous membrane electrodialysis device, a BP-A bipolar membrane electrodialysis system, and a $CO_2$ recovery and capture system. The C-A homogeneous membrane electrodialysis system includes a material chamber, a C-A homogeneous membrane electrodialysis device, a concentrated HSSs waste solution chamber, an electrode solution chamber, and corresponding pipelines and peristaltic pumps. The BP-A bipolar membrane electrodialysis system includes a secondary feed chamber, a BP-A bipolar membrane electrodialysis device, an acid liquor chamber, an electrode solution chamber, and corresponding pipelines and peristaltic pumps. The waste $CO_2$-lean amine solvent enters the material chamber after passing through the amine solution pretreatment filtering system. The concentrated HSSs waste solution chamber is connected to the secondary feed chamber by a buffer tank.

7 Claims, 1 Drawing Sheet

(52) U.S. Cl.
CPC .. *B01D 2252/204* (2013.01); *B01D 2257/504* (2013.01); *B01D 2311/04* (2013.01); *B01D 2311/08* (2013.01); *B01D 2311/2649* (2013.01); *B01D 2313/243* (2013.01); *B01D 2313/50* (2013.01); *B01D 2317/022* (2013.01); *B01D 2317/08* (2013.01)

(58) Field of Classification Search
CPC ............ B01D 2311/04; B01D 2311/08; B01D 2311/2649; B01D 2313/243; B01D 2313/50; B01D 2317/022; B01D 2317/08; B01D 53/1425; B01D 61/46; B01D 61/52; B01D 2311/25; B01D 53/62; B01D 53/78; B01D 53/96; B01D 61/48; Y02C 20/40; C02F 1/001; C02F 1/4693; C02F 2103/18
See application file for complete search history.

(56) References Cited

U.S. PATENT DOCUMENTS

| | | | | |
|---|---|---|---|---|
| 2002/0020625 | A1* | 2/2002 | Byszewski | B01D 53/1425<br>204/522 |
| 2004/0253159 | A1* | 12/2004 | Hakka | B01D 53/1493<br>423/228 |
| 2012/0235087 | A1* | 9/2012 | Handagama | B01D 53/1475<br>422/186.04 |
| 2014/0260979 | A1* | 9/2014 | Infantino | B01D 53/1425<br>95/178 |
| 2019/0240675 | A1* | 8/2019 | Banat | B03C 1/0335 |
| 2024/0261722 | A1* | 8/2024 | Parisi | B01D 53/1412 |
| 2024/0286935 | A1* | 8/2024 | Parisi | C02F 1/4695 |

* cited by examiner

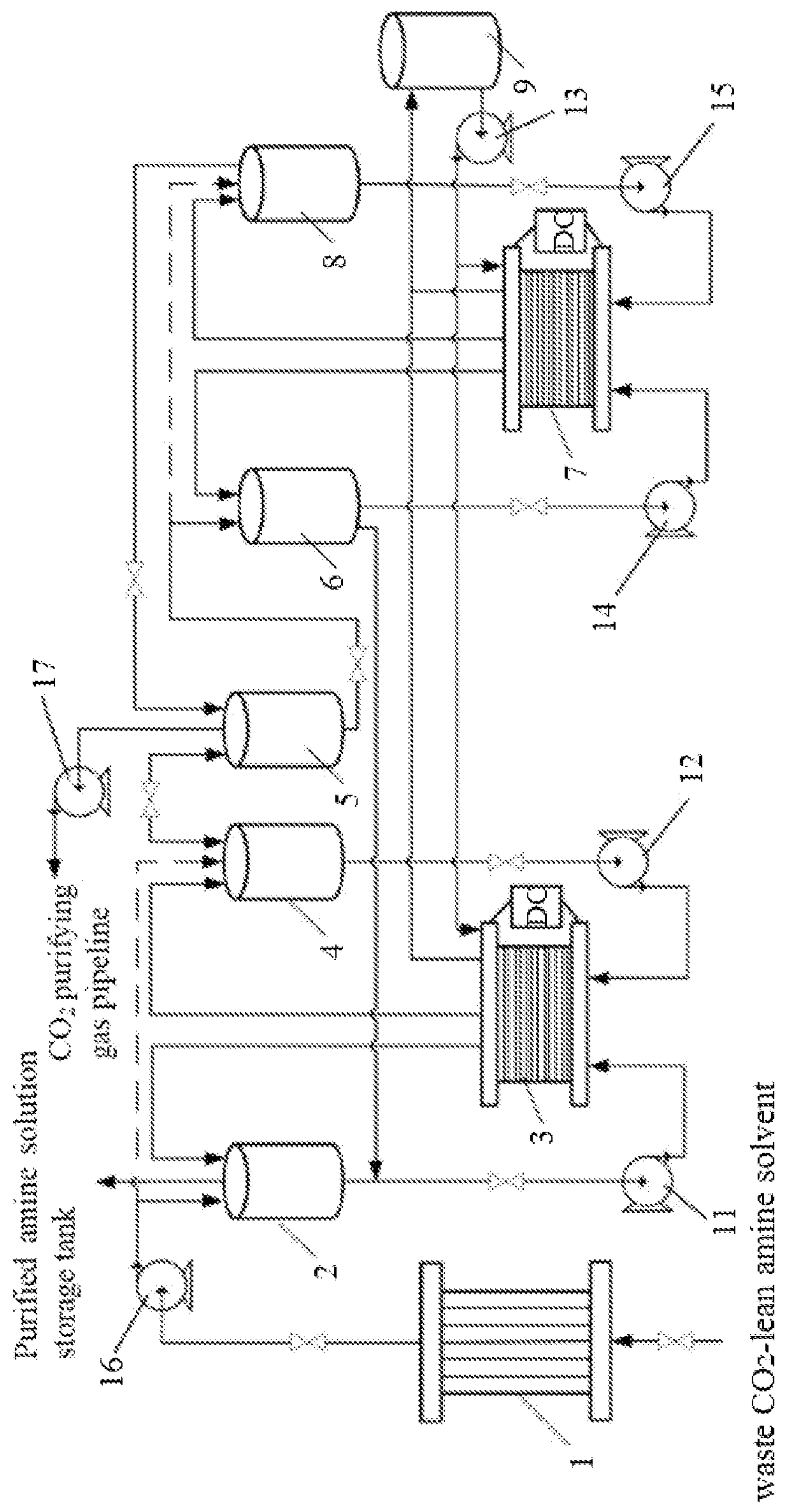
Purified amine solution
storage tank
$CO_2$ purifying
gas pipeline
waste $CO_2$-lean amine solvent
DC
DC
1
2
3
4
5
6
7
8
9
11
12
13
14
15
16
17

TWO-STAGE ELECTRODIALYSIS SYSTEM AND METHOD FOR RECOVERING WASTE $CO_2$-LEAN AMINE SOLVENT

CROSS REFERENCE TO RELATED APPLICATION

This patent application claims the benefit and priority of Chinese Patent Application No. 202111533765.8, entitled "Two-stage Electrodialysis System and Method for Recovering Waste $CO_2$-Lean Amine Solvent" filed on Dec. 15, 2021, the disclosure of which is incorporated by reference herein in its entirety as part of the present application.

TECHNICAL FIELD

The present disclosure belongs to the technical field of recovery and treatment of industrial organic waste solution, and in particular relates to a two-stage electrodialysis system and a method for recovering waste $CO_2$-lean amine solvent.

BACKGROUND ART

In a device for chemically absorbing $CO_2$, the reaction of absorbing $CO_2$ by organic amine is expressed by following formula 1-1. By taking MEA (2-Aminoethanol) as an example, organic amine molecules and $CO_2$ are subjected to a reversible reaction to produce carbamate and protonated amine. However, due to the existence of a small number of impurities, such as $O_2$, $SO_2$ and $NO_2$, in the coal-fired flue gas, and the impurities in an absorbent, the organic amine absorbent may be subjected to an irreversible chemical reaction with these impurities. These irreversible reactions are collectively known as degradation reaction. Different degradation processes, including thermal degradation and oxidative degradation, often occur simultaneously to produce a set of degradation products. The literature at present reported that the degradation products were up to 100 or more species.

(1-1)

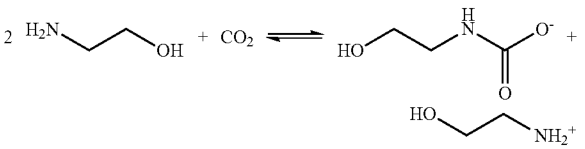

Amine degradation products are divided into neutral degradation products and heat-stable salts (HSSs) based on whether the amine degradation products maintain electric neutrality in a solution. The neutral products include amides, organic acids, imidazole, piperazine, HEEDA, HEIA, urea and other organic substances; and HSSs are salts formed by the reaction of amines as well as their acidic degradation products and impurities (such as organic acids and hydrochloric acid). These salts mainly include formic acid, acetic acid, ethanoic acid, oxalic acid, sulfate, and the like, which cannot be regenerated in the desorption tower. The tests showed that the amine loss rate in the process for chemically absorbing $CO_2$ is about 1.6 to 3.1 kgMEA/t$CO_2$, in which the loss caused by degradation accounts for about 35%. The degradation products, especially the accumulation of $HSS^-$ in the absorbent, cause not only the loss of the organic amine in the absorbent but also a series of operation problems. In general, the accumulation of HSSs in the absorbent may cause the following problems.

1. The $CO_2$ absorption capacity of the absorbent is reduced, which makes the overall performance of the system deteriorate.
2. The viscosity is increased and the mass transfer efficiency is reduced, which increases the solvent cycle cost.
3. The equipment is corroded by HSSs.
4. The gas-solution specific surface area is reduced by solution foaming.

The maximum allowable concentration of HSSs in the CCS industrial system is 0.5 wt % (5000 ppm), while the optimal concentration of HSSs for the stable operation of the device should be less than 500 ppm. Therefore, the removal of heat-stable salts and the recycling of organic amine absorbent have a great significance for ensuring the long-term stable operation of the whole CCS system.

Electrodialysis (ED) devices migrate anions from one solution chamber to another solution chamber in a directional manner under the action of anion and cation exchange membranes and an electric field. As a desalination technology, the ED has been widely used in the desalination industry since the 1950s. The application of the ED method to organic amine absorbents to remove HSSs was developed by the Dow chemical company in the early 1990s. A commercial ED device may include hundreds of stacked membrane stacks. When a voltage is applied to two electrodes, positive ions and negative ions move towards opposite electrodes and pass through the ion exchange membranes. The final effect is that ionized anions and cations are removed from a feed stream and are collected in a concentration chamber. At present, the ED technology has been successfully used for HSSs removal in refineries. However, there are very few cases of recovery using the ED technology in processes for chemically absorbing $CO_2$. In addition, in the process of removing $HSS^-$ by the traditional ED device, a neutral amine degradation product may remain in the solution, while some carbamate anions and protonated amines are transferred and lost. The loss rate may reach about 15%-20%, thereby leading to the waste of the amine solution. The produced high-concentrated amine-containing waste solution still needs to be specially treated, which increases the treatment cost.

SUMMARY

For the shortcomings in the prior art, a two-stage electrodialysis system for recovering waste $CO_2$-lean amine solvent is provided to achieve removal of HSSs in the organic amine waste solution, thus performing secondary recycling. An obtained purified amine solution has a concentration of less than 500 ppm, defects of the traditional electrodialysis recovery device are overcome, an amine loss rate is low, and no additional waste solution is generated.

A two-stage electrodialysis system for recovering waste $CO_2$-lean amine solvent, the system includes an amine solution pretreatment filtering system, a C-A homogeneous membrane electrodialysis system, a BP-A bipolar membrane electrodialysis system, and a $CO_2$ recovery and capture system.

The C-A homogeneous membrane electrodialysis system includes a material chamber, a C-A homogeneous membrane electrodialysis device, a concentrated HSSs waste solution chamber, and an electrode solution chamber. A first loop is formed by connecting the material chamber and the C-A homogeneous membrane electrodialysis device through first pipelines and a first peristaltic pump. A second loop is formed by connecting the concentrated HSSs waste solution chamber and the C-A homogeneous membrane electrodialysis device through second pipelines and a second peristaltic pump. A third loop is formed by connecting the electrode solution chamber and the C-A homogeneous membrane electrodialysis device through third pipelines and a third peristaltic pump.

The BP-A bipolar membrane electrodialysis system includes a secondary feed chamber, a BP-A bipolar membrane electrodialysis device, an acid liquor chamber and an electrode solution chamber. A fourth loop is formed by connecting the secondary feed chamber and the BP-A bipolar membrane electrodialysis device through fourth pipelines and a fourth peristaltic pump. A fifth loop is formed by connecting the acid liquor chamber and the BP-A bipolar membrane electrodialysis device through fifth pipelines and a fifth peristaltic pump. A sixth loop is formed by connecting the electrode solution chamber and the BP-A bipolar membrane electrodialysis device through sixth pipelines and the third peristaltic pump.

A to-be-treated waste $CO_2$-lean amine solvent enters the material chamber of the C-A homogeneous membrane electrodialysis system after passing through the amine solution pretreatment filtering system. The concentrated HSSs waste solution chamber is connected to the secondary feed chamber by a buffer tank. An upper part of the buffer tank is connected to the $CO_2$ recovery and capture system by seventh pipelines. Acid liquor generated in the acid liquor chamber is introduced into the buffer tank by eighth pipelines.

In some embodiments, a concentration of $HSS^-$ in the waste $CO_2$-lean amine solvent may be more than 1500 ppm and a conductivity of the waste $CO_2$-lean amine solvent is more than 8.0 ms/cm. After passing through a lean solution cooler, the waste $CO_2$-lean amine solvent is partially circulated in the system until the concentration of the $HSS^-$ may be less than 500 ppm and the conductivity of the waste $CO_2$-lean amine solvent is less than 2.0 ms/cm, and flows back to a system for chemically absorbing $CO_2$ for circulation.

In some embodiments, $CO_2$ produced by desorption in the buffer tank may be fed into a $CO_2$ purifying pipeline in a system for chemically absorbing $CO_2$ for compression, liquidation and storage, after the $CO_2$ may be pressurized by the $CO_2$ recovery and capture system.

A method for recovering waste $CO_2$-lean amine solvent the method being carried out by the two-stage electrodialysis system, the method includes:

removing solid impurities from the waste $CO_2$-lean amine solvent by the amine solution pretreatment filtering system to from another waste $CO_2$-lean amine solvent, introducing the another waste $CO_2$-lean amine solvent into the material chamber and the concentrated HSSs waste solution chamber of the C-A homogeneous membrane electrodialysis system, and turning on a DC power supply of the C-A homogeneous membrane electrodialysis system and the first peristaltic pump, the second peristaltic pump and the third peristaltic pump; starting to circulate the another waste $CO_2$-lean amine solvent in the material chamber, a concentrated HSSs waste solution produced by the concentrated HSSs waste solution chamber and an electrode solution, enabling $HSS^-$ rich in the another waste $CO_2$-lean amine solvent in the material chamber to transfer into the concentrated HSSs waste solution chamber through anion exchange membranes of the C-A homogeneous membrane electrodialysis system, enabling a concentration of $HSS^-$ in the material chamber to decrease continuously; and feeding the another waste $CO_2$-lean amine solvent in the material chamber with the concentration of $HSS^-$ less than 500 ppm back to the system for chemically absorbing $CO_2$ for circulation, after the concentration of $HSS^-$ in the material chamber is less than 500 ppm; and feeding produced concentrated HSSs waste solution into the buffer tank, and into the secondary feed chamber and the acid liquor chamber of the BP-A bipolar membrane electrodialysis system after adding acid liquor, and turning on a DC power supply of the BP-A bipolar membrane electrodialysis system and the third peristaltic pump, the fourth peristaltic pump and the fifth peristaltic pump for circulation; enabling $OH^-$ and $H^+$ produced by a bipolar membrane to enter the secondary feed chamber and the acid liquor chamber, respectively, and enabling $HSS^-$ in the secondary feed chamber to enter the acid liquor chamber through the anion exchange membrane, enabling a concentration of the $HSS^-$ in the secondary feed chamber to decrease continuously, and feeding the concentrated HSSs waste solution in the secondary feed chamber into the material chamber of the C-A homogeneous membrane electrodialysis system through the first pipelines, and subsequently back to the system for chemically absorbing $CO_2$ for circulation, after the concentration of the $HSS^-$ in the second feed chamber is less than 500 ppm; wherein acid produced in the acid liquor chamber is configured for desorption of $CO_2$ in the buffer tank and for cleaning a subsequent membrane stack of the C-A homogeneous membrane electrodialysis system and a subsequent membrane stack of the BP-A bipolar membrane electrodialysis system.

In some embodiments, the membrane stack of the C-A homogeneous membrane electrodialysis system may include more than five anion exchange membranes and more than five first cation exchange membranes. Each of the more than five anion exchange membranes and a corresponding one of the more than five first cation exchange membranes may be paired. The more than five anion exchange membranes and the more than five first cation exchange membranes membrane may be arranged alternately in sequence of one cation exchange membrane C, one anion exchange membrane A, and another one cation exchange membrane C. The membrane stack of the BP-A bipolar membrane electrodialysis system may include more than five bipolar membranes and more than five second anion exchange membranes. Each of the more than five bipolar membranes and a corresponding one of the more than five second anion exchange membranes may be paired. The more than five bipolar membranes and the more than five anion exchange membranes may be alternately arranged in sequence of one bipolar membrane BP, one anion membrane A, and another one bipolar membrane BP. In some embodiments, the electrode solution in the electrode solution chamber in each of the C-A homogeneous membrane electrodialysis system and the BP-A bipolar membrane electrodialysis system may be a $Na_2SO_4$ solution with a concentration of 0.1 to 1.0 mol/L.

In some embodiments, the DC power supply of the C-A homogeneous membrane electrodialysis system may have a voltage of 0 to 15 V and an upper current density limit of 400 $A/m^2$.

In some embodiments, the DC power supply of the BP-A bipolar membrane electrodialysis system may have a voltage of 0 to 35 V and an upper current density limit of 800 $A/m^2$.

In some embodiments, operation temperatures in the amine solution pretreatment filtering system, the C-A homogeneous membrane electrodialysis system and the BP-A bipolar membrane electrodialysis system may be less than 40° C.

In accordance with the embodiments, a pretreatment mechanical filtering device is used for preliminarily treating waste $CO_2$-lean amine solvent, an obtained material with low solid impurity content and high $HSS^-$ ion concentration is fed into a C-A homogeneous membrane electrodialysis device, and is subjected to the removal of $HSS^-$ to obtain a purified amine solution with a HSSs concentration below 500 ppm and a concentrated waste solution with a high HSS concentration. The concentrated waste solution first enters the buffer tank, and enters the secondary feed chamber and an acid liquor chamber of the BP-A bipolar membrane electrodialysis device after adding excess acid liquor for $CO_2$ desorption, thus further obtaining a purified amine solution and the acid liquor. The waste $CO_2$-lean amine solvent is continuously introduced into the two-stage electrodialysis system to continuously obtain that the purified amine solution enters into the system for chemically absorbing $CO_2$ for circulation. The system and the method provided by the embodiments not only can reduce a content of the HSSs in the waste $CO_2$-lean amine solvent to obtain the purified amine solution and improve the operation stability of the system for chemically absorbing $CO_2$, but also can achieve secondary recycling of the concentrated HSSs waste solution by the bipolar membrane system to further reduce the organic amine loss rate. In accordance with the whole system, no additional waste solution is produced, and the cost for handling the waste solution is reduced.

BRIEF DESCRIPTION OF THE DRAWINGS

FIG. 1 is a structure diagram of a two-stage electrodialysis system for recovering waste $CO_2$-lean amine solvent according to the present disclosure.

List of the reference characters: 1 pretreatment mechanical filtering device; 2 material chamber; 3 C-A homogeneous membrane electrodialysis device; 4 concentrated HSSs waste solution chamber; 5 buffer tank; 6 secondary feed chamber 6; 7 BP-A bipolar membrane electrodialysis device; 8 acid liquor chamber; 9 electrode solution chamber; 11 first peristaltic pump; 12 second peristaltic pump; 13 third peristaltic pump; 14 fourth peristaltic pump; 15 fifth peristaltic pump; 16 sixth peristaltic pump; and 17 seventh peristaltic pump.

DETAILED DESCRIPTION OF THE EMBODIMENTS

The present disclosure is further described in detail below with reference to the accompanying drawings and embodiments. It needs to be noted that the following embodiments are intended to facilitate the understanding of the present disclosure and do not set any limit thereon.

As shown in FIG. 1, a two-stage electrodialysis system for recovering waste $CO_2$-lean amine solvent includes an amine solution pre-treatment filtering system, a C-A homogeneous membrane electrodialysis system, a BP-A bipolar membrane electrodialysis system and a $CO_2$ recovery and capture system.

The C-A homogeneous membrane electrodialysis system includes a material chamber 2, a C-A homogeneous membrane electrodialysis device 3, a concentrated HSSs waste solution chamber 4, an electrode solution chamber 9, and corresponding valves and pipelines. A loop is formed by connecting the material chamber 2 and the C-A homogeneous membrane electrodialysis device 3 through pipelines and a first peristaltic pump 11. A loop is formed by connecting the concentrated HSSs waste solution chamber 4 and the C-A homogeneous membrane electrodialysis device 3 through pipelines and a second peristaltic pump 12. A loop is formed by connecting the electrode solution chamber 9 and the C-A homogeneous membrane electrodialysis device 3 through pipelines and a third peristaltic pump 13.

The BP-A bipolar membrane electrodialysis system includes a secondary feed chamber 6, a BP-A bipolar membrane electrodialysis device 7, an acid liquor chamber 8, an electrode solution chamber 9, and corresponding valves and pipelines. A loop is formed by connecting the secondary feed chamber 6 and BP-A bipolar membrane electrodialysis device 7 through pipelines and a fourth peristaltic pump 14. A loop is formed by connecting the acid liquor chamber 8 and the BP-A bipolar membrane electrodialysis device 7 through pipelines and a fifth peristaltic pump 15. A loop is formed by connecting the electrode solution chamber 9 and the BP-A bipolar membrane electrodialysis device 7 through pipelines and the third peristaltic pump 13.

The concentrated HSSs waste solution chamber 4 is connected to the secondary feed chamber 6 by a buffer tank 5. An upper part of the buffer tank 5 is connected to the $CO_2$ recovery and capture system by pipelines. Acid liquor generated in the acid liquor chamber 8 is introduced into the buffer tank 5 by pipelines.

The amine solution pretreatment filtering system includes a pretreatment mechanical filtering device 1, inlet and outlet pipelines, a sixth peristaltic pump 16 at an outlet and valves, and can filter solid impurities from the introduced waste solution. A to-be-treated waste $CO_2$-lean amine solvent enters the material chamber 2 of the C-A homogeneous membrane electrodialysis system after passing through the amine solution pretreatment filtering system. The $CO_2$ recovery and capture system includes a gas outlet pipeline above the buffer tank 5, a seventh peristaltic pump 17, and a subsequently connected $CO_2$ purifying gas pipeline.

A method for recovering an waste $CO_2$-lean amine solvent using the system above includes the following steps.

The waste $CO_2$-lean amine solvent, after removing solid impurities by the amine solution pretreatment filtering system to from another waste $CO_2$-lean amine solvent, is introduced into the material chamber 2 and the concentrated HSSs waste solution chamber 4 of the C-A homogeneous membrane electrodialysis system, and a DC power supply of the C-A homogeneous membrane electrodialysis system and the first peristaltic pump 11, the second peristaltic pump 12 and the third peristaltic pump 13 are turned on; the another waste $CO_2$-lean amine solvent in the material chamber 2, a concentrated HSSs waste solution produced by the concentrated HSSs waste solution chamber 4 and an electrode solution start to circulate, heat-stable salt ions (HSS) rich in the another waste $CO_2$-lean amine solvent in the material chamber 2 transfers into the concentrated HSSs waste solution chamber 4 through anion exchange membranes of the C-A homogeneous membrane electrodialysis system, a concentration of the $HSS^-$ in the material chamber 2 decreases continuously, and after the concentration of the $HSS^-$ in the material chamber 2 is less than 500 ppm, the another waste $CO_2$-lean amine solvent in the material chamber 2 with the concentration of $HSS^-$ less than 500 ppm is fed back to the system for chemically absorbing $CO_2$ for circulation.

Produced concentrated HSSs waste solution is fed into the buffer tank 5, and is fed into secondary feed chamber 6 and acid liquor chamber 8 of the BP-A bipolar membrane electrodialysis system after adding excess acid liquor, and a DC power supply of the BP-A bipolar membrane electrodialysis system and the third peristaltic pump 13, the fourth peristaltic pump 14 and the fifth peristaltic pump 15 are turned on for circulation. $OH^-$ and $H^+$ produced by a bipolar membrane enter the secondary feed chamber 6 and the acid liquor chamber 8, respectively, and the $HSS^-$ in the secondary feed chamber 6 enters the acid liquor chamber 8 through the anion exchange membranes, a concentration of the $HSS^-$ in the secondary feed chamber 6 decreases continuously, and after the $HSS^-$ concentration in the second feed chamber 6 is less than 500 ppm, the concentrated HSSs waste solution in the secondary feed chamber 6 is fed into the material chamber 2 of the C-A homogeneous membrane electrodialysis system through pipelines, and is subsequently fed back to the system for chemically absorbing $CO_2$ for circulation. Acid produced in the acid liquor chamber 8 is configured for desorption of $CO_2$ in the buffer tank 5 and for cleaning a subsequent membrane stack of the C-A homogeneous membrane electrodialysis system and a subsequent membrane stack of the BP-A bipolar membrane electrodialysis system.

The C-A homogeneous membrane electrodialysis system has the advantages of high HSSs removal rate, low energy consumption and simple structure. The BP-A bipolar membrane electrodialysis system can produce $OH^-$ and $H^+$ under the action of an electric field. $OH^-$ is used to replace $HSS^-$ in concentrated HSSs waste solution, and $H^+$ and $HSS^-$ are combined to generate a variety of acids in the acid liquor chamber, thus obtaining the product which is a purified amine solution.

In accordance with the present disclosure, a concentration of an $HSS^-$ in the waste $CO_2$-lean amine solvent is more than 1500 ppm and a conductivity of the waste $CO_2$-lean amine solvent is more than 8.0 ms/cm. After passing through a lean solution cooler, the waste $CO_2$-lean amine solvent is partially circulated in the system until the concentration of the $HSS^-$ is less than 500 ppm and the conductivity is less than 2.0 ms/cm, and flows back to a system for chemically absorbing $CO_2$ for circulation. A membrane stack of the C-A homogeneous membrane electrodialysis system includes ten anion exchange membranes and ten cation exchange membranes, and each of the ten anion exchange membranes and a corresponding one of the ten cation exchange membranes are paired. A membrane stack of the BP-A bipolar membrane electrodialysis system includes ten bipolar membranes and ten anion exchange membranes, and each of the ten bipolar membranes and a corresponding one of the ten anion exchange membrane are paired. A single membrane (any one of the membranes mentioned above) has an effective area of 55 $cm^2$. A single anion exchange membrane has a thickness of 180 μm and a resistance of 2.3 $\Omega/cm^2$. A single cation exchange membrane has a thickness of 150 μm and a resistance is 1.9 omega/$cm^2$. A single bipolar membrane has a thickness of 280-340 μm.

In this embodiment, an electrode solution for each of the C-A homogeneous membrane electrodialysis system and the BP-A bipolar membrane electrodialysis system is a $Na_2SO_4$ solution with a concentration of 0.5 mol/L. The DC power supply of the C-A homogeneous membrane electrodialysis system has a voltage of 15 V and an upper current limit of 2.2 A. The DC power supply of the BP-A bipolar membrane electrodialysis system has a voltage of 35 V and an upper current limit of 4.4 A. An operation temperature of each of the amine solution pretreatment filtering system, the C-A homogeneous membrane electrodialysis system and the BP-A bipolar membrane electrodialysis system is less than 40° C. A flow rate of each of the peristaltic pumps for the C-A homogeneous membrane electrodialysis system and the BP-A bipolar membrane electrodialysis system is 500 ml/min.

To verify the effect of the embodiment, the system of the present disclosure is carried out the recovery testing of the waste $CO_2$-lean amine solvent.

In the amine solution pretreatment filtering system, a flow rate of the sixth peristaltic pump 16 is 500 ml/min.

In the C-A homogeneous membrane electrodialysis system, ion membranes used in the C-A homogeneous membrane electrodialysis device 3 include one anion membrane with model AGU and two cation membrane with model CSE-2 produced by ASTOM Corporation. The ion exchange membranes are stacked alternately in sequence of one cation exchange membrane C, one anion exchange membrane A, and another one cation exchange membrane C (i.e., C-A-C order), so as to form a single one group of membrane pairs. Ten membrane pairs are repeatedly stacked and fixed with an outer frame to form a membrane stack. The membrane stack is fixed to a middle of a cathode plate and an anode plate, and the anode plate and the cathode plate are connected to a positive electrode and a negative electrode of the DC power supply DC respectively to form the C-A homogeneous membrane electrodialysis device 3. A single membrane (any one of the membranes mentioned above) has an effective area of 55 $cm^2$. A single cation exchange membrane has a thickness of 180 μm and a resistance of 2.3 $\Omega/cm^2$. A single anion exchange membrane has a thickness of 150 μm and a resistance of 1.9 $\Omega/cm^2$. The membrane stack is separated by the ion membranes to form the material chamber 2, the concentrated HSSs waste solution chamber 4, and an electrode solution chamber 9 in sequence. Flow rates of the solution entering the C-A homogeneous membrane electrodialysis device 3 from the material chamber 2, the concentrated HSSs waste solution chamber 4 and the electrode solution chamber 9 are respectively controlled by the first peristaltic pump 11, the second peristaltic 12 and the third peristaltic pump 13 to be 500 ml/min, thus forming three circulating loops which are a material loop, a concentrated HSSs waste solution loop, and an electrode solution loop.

In the BP-A bipolar membrane electrodialysis system, an ion membrane used in the BP-A bipolar membrane electrodialysis device 7 include one anion membrane with model AGU and two bipolar membranes with model BPU produced by ASTOM Corporation. The ion exchange membranes are stacked in sequence of one bipolar membrane BP, one anion membrane A, and another one bipolar membrane BP (i.e., BP-A-BP order), so as to form a single one group of membrane pairs. Ten membrane pairs are repeatedly stacked and fixed with an outer frame to form the membrane stack. The membrane stack is fixed to the middle of a cathode plate and an anode plate, and the anode plate and the cathode plate are connected to the positive electrode and the negative electrode of the DC power supply DC respectively to form the BP-A bipolar membrane electrodialysis device 7. A single membrane (any one of the membranes mentioned above) has an effective area of 55 $cm^2$. A single cation exchange membrane has a thickness of 180 μm and a resistance of 2.3 $\Omega/cm^2$. A single bipolar membrane has a thickness of 280-340 μm. The membrane stack is separated by the ion membranes to form the secondary feed chamber 6, the acid liquor chamber 8, and an electrode solution chamber 9 in sequence. Flow rates of the solution entering the BP-A bipolar membrane electrodialysis device 7 from the secondary feed chamber 6, the acid liquor chamber 8, and the electrode solution chamber 9 are respectively controlled by the fourth peristaltic pump 14, the fifth peristaltic 15 and the third peristaltic pump 13 to be 500 ml/min, thus forming three circulating loops which are a secondary feed loop, an acid liquor loop, and an electrode solution loop.

The waste $CO_2$-lean amine solvent is treated using the system above. The waste solution has an organic amine concentration of 23.8 wt %, an initial HSSs concentration of 2000 ppm, a conductivity of 9.8 ms/cm, and $CO_2$ load of 0.15 mol/mol. After filtering the solid impurities from the waste solution by the amine solution pretreatment filtering system, 1 L of waste solution is added into the material chamber 2 and the concentrated HSSs waste solution chamber 4 successively, and 1 L of 0.5 mol/L sodium sulfate solution is added into the electrode solution chamber 9. Three peristaltic pumps of the C-A homogeneous membrane electrodialysis are turned on, and the DC power supply DC is turned on after the flow rate is regulated to 500 ml/min, an output voltage is set to be 15 V and the upper current limit is set to be 2.2 A for operation of the system. After operating for 80 min, a conductivity of an amine solution in the material chamber 2 is reduced to 0.6 ms/cm, a conductivity of the solution in the concentrated HSSs waste solution chamber 4 is increased to 19.2 ms/cm, and the HSSs concentration in the material chamber 2 is reduced below 100 ppm. The DC power supply and the three peristaltic pumps are turned off. The amine solution in the material chamber 2 is returned to the system for chemically absorbing $CO_2$ for circulating, and the concentrated HSSs waste solution is pumped into the buffer tank 5 for further treatment.

Excess acid liquor (the prepared dilute sulfuric acid is employed during first being added, and the subsequent acid liquor is provided by the acid liquor chamber 8) is added into the amine solution in the buffer tank 5, and the desorbed $CO_2$ enters a gas pipeline to be further pumped into the $CO_2$ purifying gas pipeline. The amine solution is respectively pumped into the secondary feed chamber 6 and the acid liquor chamber 8 by about 500 ml, and the concentration of the HSSs in both chambers is about 4000 ppm. The three peristaltic pumps of the BP-A bipolar membrane electrodialysis system are turned on. The DC power supply DC is turned on after the flow rate is regulated to 500 ml/min. Further, the output voltage is set to be 25 V and the upper current limit is set to be 4.4 A for operation. After operating for 30 min, the conductivity of the amine solution in the secondary feed chamber 6 is decreased to 5.4 ms/cm, the conductivity in the acid liquor chamber is increased to 25.1 ms/cm, and the HSSs concentration in the secondary feed chamber 6 is reduced below 200 ppm. The DC power supply and the three peristaltic pumps are turned off. The solution in the secondary feed chamber 6 is returned to the material chamber 2, and the solution in the acid liquor chamber 8 is used for subsequent $CO_2$ desorption in the buffer tank 5 and for cleaning membrane stack.

In accordance with the system, the waste organic amine solution in the system for chemically absorbing $CO_2$ is recovered and purified by using the two-stage electrodialysis device, and the purified organic amine absorbent is obtained. The whole system does not produce waste solution, and has the characteristics of simple equipment, good HSSs removal effect and small loss of organic amine.

The above embodiments are a detailed description of the technical solutions and beneficial effects of the present disclosure. It should be understood that the above are only specific embodiments of the present disclosure and are not intended to limit the present disclosure, and any modifications, additions and equivalent replacements made within the scope of the principles of the present disclosure shall be included in the scope of protection of the present disclosure.

What is claimed is:

1. A method for recovering waste $CO_2$-lean amine solvent the method being carried out by a two-stage electrodialysis system, the system comprising an amine solution pretreatment filtering system, a C-A homogeneous membrane electrodialysis system, a BP-A bipolar membrane electrodialysis system, and a $CO_2$ recovery and capture system;

wherein the C-A homogeneous membrane electrodialysis system comprises a material chamber, a C-A homogeneous membrane electrodialysis device, a concentrated HSSs waste solution chamber, and an electrode solution chamber; a first loop is formed by connecting the material chamber and the C-A homogeneous membrane electrodialysis device through first pipelines and a first peristaltic pump; a second loop is formed by connecting the concentrated HSSs waste solution chamber and the C-A homogeneous membrane electrodialysis device through second pipelines and a second peristaltic pump; and a third loop is formed by connecting the electrode solution chamber and the C-A homogeneous membrane electrodialysis device through third pipelines and a third peristaltic pump;

the BP-A bipolar membrane electrodialysis system comprises a secondary feed chamber, a BP-A bipolar membrane electrodialysis device, an acid liquor chamber and the electrode solution chamber; a fourth loop is formed by connecting the secondary feed chamber and the BP-A bipolar membrane electrodialysis device through fourth pipelines and a fourth peristaltic pump; a fifth loop is formed by connecting the acid liquor chamber and the BP-A bipolar membrane electrodialysis device through fifth pipelines and a fifth peristaltic pump; and a sixth loop is formed by connecting the electrode solution chamber and the BP-A bipolar membrane electrodialysis device through sixth pipelines and the third peristaltic pump;

a to-be-treated waste $CO_2$-lean amine solvent enters the material chamber of the C-A homogeneous membrane electrodialysis system after passing through the amine solution pretreatment filtering system; the concentrated HSSs waste solution chamber is connected to the secondary feed chamber by a buffer tank; an upper part of the buffer tank is connected to the $CO_2$ recovery and capture system by seventh pipelines, and acid liquor generated in the acid liquor chamber is introduced into the buffer tank by eighth pipelines;

the method comprising:

removing solid impurities from the waste $CO_2$-lean amine solvent by the amine solution pretreatment filtering system to from another waste $CO_2$-lean amine solvent, introducing the another waste $CO_2$-lean amine solvent into the material chamber and the concentrated HSSs waste solution chamber of the C-A homogeneous membrane electrodialysis system, and turning on a DC power supply of the C-A homogeneous membrane electrodialysis system and the first peristaltic pump, the second peristaltic pump and the third peristaltic pump;

starting to circulate the another waste $CO_2$-lean amine solvent in the material chamber, a concentrated HSSs waste solution produced by the concentrated HSSs waste solution chamber and an electrode solution, enabling HSS-rich in the another waste $CO_2$-lean amine solvent in the material chamber to transfer into the concentrated HSSs waste solution chamber through anion exchange membranes of the C-A homogeneous membrane electrodialysis system, enabling a concentration of HSS in the material chamber to decrease continuously; and feeding the another waste $CO_2$-lean amine solvent in the material chamber with the concentration of HSS less than 500 ppm back to the system for chemically absorbing $CO_2$ for circulation, after the concentration of $HSS^-$ in the material chamber is less than 500 ppm; and feeding produced concentrated HSSs waste solution into the buffer tank, and into the secondary feed chamber and the acid liquor chamber of the BP-A bipolar membrane electrodialysis system after adding acid liquor, and turning on a DC power supply of the BP-A bipolar membrane electrodialysis system and the third peristaltic pump, the fourth peristaltic pump and the fifth peristaltic pump for circulation; enabling $OH^-$ and $H^+$ produced by a bipolar membrane to enter the secondary feed chamber and the acid liquor chamber, respectively, and enabling $HSS^-$ in the secondary feed chamber to enter the acid liquor chamber through anion exchange membranes of the BP-A bipolar membrane electrodialysis system, enabling a concentration of the $HSS^-$ in the secondary feed chamber to decrease continuously, and feeding the concentrated HSSs waste solution in the secondary feed chamber into the material chamber of the C-A homogeneous membrane electrodialysis system through the first pipelines, and subsequently back to the system for chemically absorbing $CO_2$ for circulation, after the concentration of the $HSS^-$ in the second feed chamber is less than 500 ppm; wherein acid produced in the acid liquor chamber is configured for desorption of $CO_2$ in the buffer tank and for cleaning a subsequent membrane stack of the C-A homogeneous membrane electrodialysis system and a subsequent membrane stack of the BP-A bipolar membrane electrodialysis system.

2. The method for recovering the waste $CO_2$-lean amine solvent according to claim 1, wherein the membrane stack of the C-A homogeneous membrane electrodialysis system comprises more than five anion exchange membranes and more than five first cation exchange membranes, each of the more than five anion exchange membranes and a corresponding one of the more than five first cation exchange membranes are paired; the more than five anion exchange membranes and the more than five first cation exchange membranes membrane are arranged alternately in sequence of one cation exchange membrane C, one anion exchange membrane A, and another one cation exchange membrane C; the membrane stack of the BP-A bipolar membrane electrodialysis system comprises more than five bipolar membranes and more than five second anion exchange membranes, each of the more than five bipolar membranes and a corresponding one of the more than five second anion exchange membranes are paired, and the more than five bipolar membranes and the more than five anion exchange membranes are alternately arranged in sequence of one bipolar membrane BP, one anion membrane A, and another one bipolar membrane BP.

3. The method for recovering the waste $CO_2$-lean amine solvent according to claim 1, wherein the electrode solution in the electrode solution chamber in each of the C-A homogeneous membrane electrodialysis system and the BP-A bipolar membrane electrodialysis system is a $Na_2SO_4$ solution with a concentration of 0.1 to 1.0 mol/L.

4. The method for recovering the waste $CO_2$-lean amine solvent according to claim 1, wherein the DC power supply of the C-A homogeneous membrane electrodialysis system has a voltage of 0 to 15 V and an upper current density limit of 400 $A/m^2$.

5. The method for recovering the waste $CO_2$-lean amine solvent according to claim 1, wherein the DC power supply of the BP-A bipolar membrane electrodialysis system has a voltage of 0 to 35 V and an upper current density limit of 800 $A/m^2$.

6. The method for recovering the waste $CO_2$-lean amine solvent according to claim 1, wherein operation temperatures in the amine solution pretreatment filtering system, the C-A homogeneous membrane electrodialysis system and the BP-A bipolar membrane electrodialysis system are less than 40° C.

7. The method for recovering the waste $CO_2$-lean amine solvent according to claim 1, wherein $CO_2$ produced by desorption in the buffer tank is fed into a $CO_2$ purifying pipeline in a system for chemically absorbing $CO_2$ for compression, liquidation and storage, after the $CO_2$ is pressurized by the $CO_2$ recovery and capture system.

* * * * *